United States Patent
Wolfe et al.

(10) Patent No.: US 8,203,541 B2
(45) Date of Patent: Jun. 19, 2012

(54) OLED DISPLAY AND SENSOR

(75) Inventors: Andrew Wolfe, Los Gatos, CA (US); Thomas Martin Conte, Atlanta, GA (US)

(73) Assignee: Empire Technology Development LLC, Wilmington, DE (US)

( * ) Notice: Subject to any disclaimer, the term of this patent is extended or adjusted under 35 U.S.C. 154(b) by 547 days.

(21) Appl. No.: 12/402,332

(22) Filed: Mar. 11, 2009

(65) Prior Publication Data

US 2010/0231528 A1    Sep. 16, 2010

(51) Int. Cl.
*G06F 3/042*    (2006.01)
(52) U.S. Cl. .......................................... 345/175
(58) Field of Classification Search ................. None
See application file for complete search history.

(56) References Cited

U.S. PATENT DOCUMENTS

| | | | |
|---|---|---|---|
| 4,293,734 A | 10/1981 | Pepper, Jr. | |
| 4,853,498 A | 8/1989 | Meadows et al. | |
| 5,041,701 A | 8/1991 | Wolfe et al. | |
| 5,438,168 A | 8/1995 | Wolfe et al. | |
| 5,510,813 A | 4/1996 | Makinwa et al. | |
| 5,736,688 A | 4/1998 | Barrett et al. | |
| 6,037,930 A | 3/2000 | Wolfe et al. | |
| 6,623,608 B2 | 9/2003 | Cropper et al. | |
| 6,879,319 B2 | 4/2005 | Cok | |
| 6,885,157 B1 | 4/2005 | Cok et al. | |
| 7,042,444 B2 * | 5/2006 | Cok | 345/173 |
| 7,167,169 B2 | 1/2007 | Libsch et al. | |
| 7,230,608 B2 | 6/2007 | Cok | |
| 7,652,663 B2 * | 1/2010 | Sun | 345/207 |
| 2003/0111588 A1 | 6/2003 | Chen | |
| 2004/0140961 A1 | 7/2004 | Cok | |
| 2005/0030162 A1 | 2/2005 | Stambaugh | |
| 2005/0052141 A1 | 3/2005 | Thielemans et al. | |
| 2006/0290684 A1 * | 12/2006 | Giraldo et al. | 345/175 |
| 2007/0091030 A1 * | 4/2007 | Drevillon et al. | 345/76 |
| 2007/0236425 A1 * | 10/2007 | Furuie et al. | 345/77 |
| 2009/0189878 A1 * | 7/2009 | Goertz et al. | 345/175 |
| 2010/0177060 A1 * | 7/2010 | Han | 345/174 |

FOREIGN PATENT DOCUMENTS

KR    10-2009-0006543 A    1/2009

* cited by examiner

*Primary Examiner* — Wayne Young
*Assistant Examiner* — Brian Butcher
(74) *Attorney, Agent, or Firm* — Dorsey & Whitney LLP

(57) ABSTRACT

The present disclosure relates to a display device with an OLED display including a plurality of nodes configured to emit light when drive circuitry provides a signal across the plurality of nodes at or above an illumination threshold. Measurement circuitry may be disposed proximate to the plurality of nodes and may be configured to sense the light reflected off of an object positioned over the OLED display to provide measurement signals. The measurement signals can be evaluated to determine the location of the display proximate to the object that provides the reflected light.

19 Claims, 10 Drawing Sheets

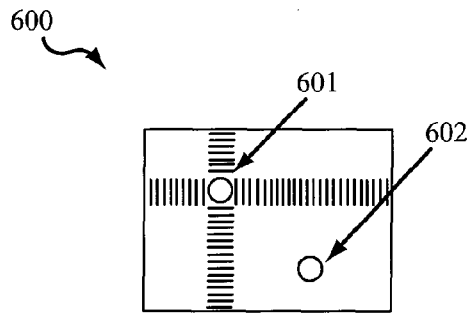
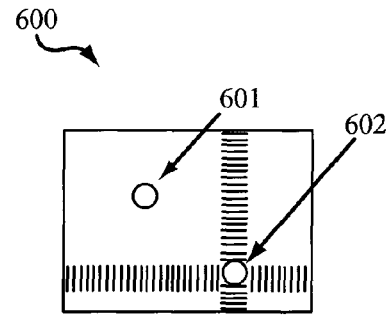
FIG. 6A  FIG. 6B
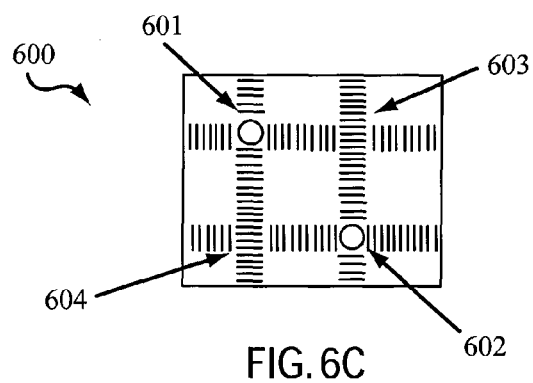
FIG. 6C
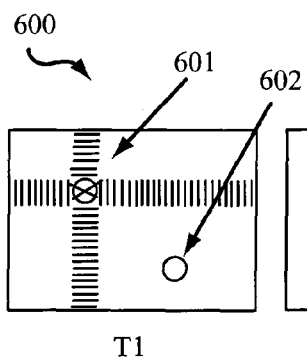 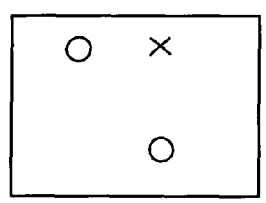 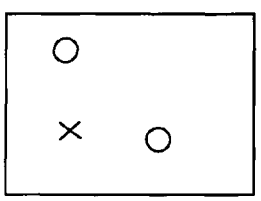 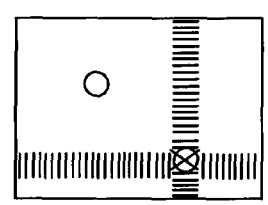
FIG. 6D  FIG. 6E  FIG. 6F  FIG. 6G 800 A computer program product 810 A signal bearing medium 820 At least one of
one or more instructions for emitting light from a plurality of nodes on an OLED display when a power supply provides a voltage across the plurality of nodes at or above an illumination threshold;
one or more instructions for emitting at least pulsed light from the plurality of nodes;
one or more instructions for reflecting light from the object proximate to the display;
one or more instructions for detecting the reflected light using the measurement circuitry;
one or more instructions for detecting the reflected light using the measurement circuitry by filtering out non-pulsed light;
one or more instructions for amplifying a plurality of signals generated by the measurement circuitry in response to detecting the reflected light, and converting the plurality of amplified signals to a plurality of digital signals; or
one or more instructions for determining the location of the display proximate to the object providing the reflected light.

| 822 A computer-readable medium | 824 A recordable medium | 826 A communications medium |

FIG. 8A

OLED DISPLAY AND SENSOR

BACKGROUND

Organic light emitting diodes (OLEDs) have a series of thin films of organic semiconductor material that produce light in the presence of electricity. OLEDs may be used as a display device in a variety of electronic devices including hand-held devices such as mobile phones and cameras, and display monitors coupled to computer systems.

BRIEF DESCRIPTION OF THE FIGURES

The foregoing and other features of the present disclosure will become more fully apparent from the following description and appended claims, taken in conjunction with the accompanying drawings. Understanding that these drawings depict only several examples in accordance with the disclosure and are, therefore, not to be considered limiting of its scope, the disclosure will be described with additional specificity and detail through use of the accompanying drawings, in which:

FIGS. 6A-G depict the locations of two simultaneous touches an OLED display according to certain examples;

FIG. 8A is a diagram of a system suitable for integrating with OLED display devices and measurement circuitry in accordance with certain examples.

DETAILED DESCRIPTION

Figure 1:
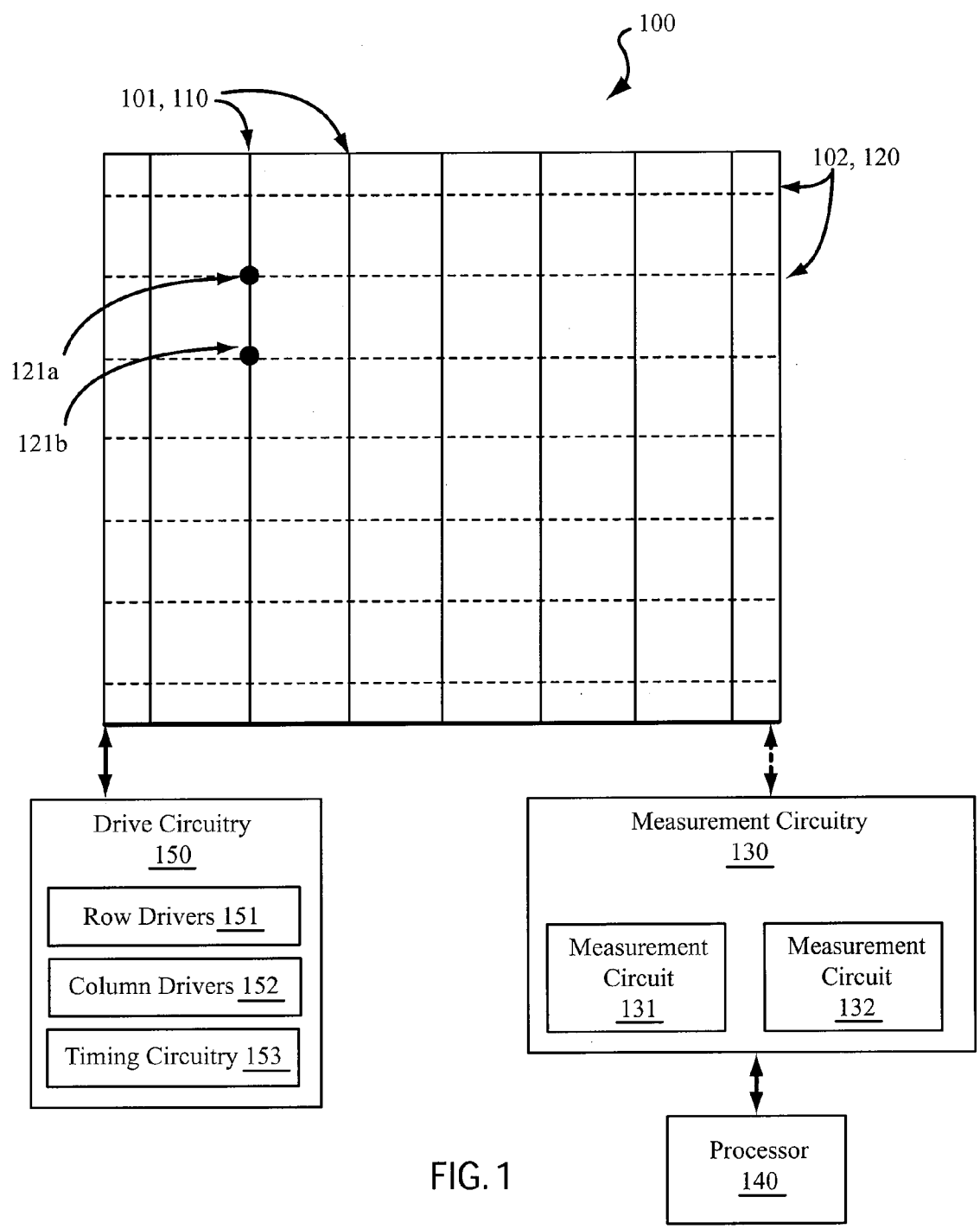
FIG. 1 depicts an OLED display device and associated components according to certain examples.

In the following detailed description, reference is made to the accompanying drawings, which form a part hereof. In the drawings, similar symbols typically identify similar components, unless context dictates otherwise. The illustrative examples described in the detailed description, drawings, and claims are not meant to be limiting. Other examples may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is drawn, inter alia, to methods, apparatus, computer programs and systems related to accurately identifying the location or proximity of a touch on a display (e.g., a display in a hand-held device or a computer monitor) by configuring light sensor circuitry to sense reflected light produced by a LED display in an area touched.

According to certain implementations, display circuitry driving an organic LED (OLED) display provides a source of light for a reflective touch screen. Light emitted from the OLED display may reflect off of an object touching the surface of the display, or proximate to the surface of the display, and may be sensed by sensors configured to sense the reflected light. Signals associated with the sensed reflected light may be used to identify the location of the display touched. OLED devices, such as the OLED display devices disclosed herein, may be useful in display and reflective touch sensing applications because when light emitted from the OLED reflects off of an object touching the display, the light reflects through the transparent or semitransparent OLED display layers, and measurement circuitry may sense the light passing back through the display.

In some examples, light may be provided by an illuminated LED pixel intermittently, for a short time period (e.g., on the order of a few milliseconds or microseconds), followed by a relatively long time period of non-illumination or image-dependent illumination. For example, the OLED display may be driven so that light may be produced by the LED pixels at short pulse rates and at illumination levels that would be recognized by a human viewer. In one example, a pulse of light may be provided above a detection threshold, and the time period of the pulse may be one millisecond ($\frac{1}{1000}$ of a second), at a rate of 25 pulses per second. Thus, over the course of 1 second, a LED pixel may be illuminated for 25 milliseconds or for 1 millisecond every 40 milliseconds. As can be appreciated, this pulse rate would not be visible to a user because the human eye may not able to discern light pulses having such a short duration at limited brightness separated by a relatively long period of inactivity. In this example, although pulsed light may not be visible to a user, measurement circuits having an adequate sensing speed and sensitivity may be provided to sense the pulsed light.

In other examples, light emitted from the LED pixel may be visible to a user. The visible light may be reflected off of an object and measurement circuitry configured as photo detectors, photo diodes and/or photo transistors, for example, and may sense a reflection of the light when an object contacts the OLED display surface.

LED pixels may emit light during the "on portion" of a duty cycle and may refresh during the "off portion" of the duty cycle. For example, the light emitting portion of a duty cycle may be 20 milliseconds and the refresh portion may be 2 milliseconds. According to certain implementations, the LED pixel emits pulsed light during the refresh portion of the duty cycle, and the measurement circuitry may sense a reflection of the pulsed light. Light emitted during the "on portion" of the duty cycle may be filtered out or disregarded by the measurement circuit and/or may be sensed as a reflection according to the above implementation. In some examples, an optical filter may be used to filter out noise which, for example, may be uninteresting light from the sensors, light at different frequencies than the light frequency to be detected, light from angles different from the angle of light to be detected, or light from other objects.

OLED displays are composed of a series of OLED columns and rows. Thus, in certain implementations, LED pixels in an OLED display may also be illuminated on a per column or per row basis. The row or column pixel illumination may be incremental and may cycle through each row and/or column of the display so that a scan of the OLED display may be performed. A scan may occur multiple times per second, e.g., sixty times per second.

In certain implementations, an OLED display may be provided with an array of a plurality of LED pixels, and in some examples, each pixel may be associated with a measurement circuit. The association between the LED pixel and the measurement circuit may be a proximity association, in which light produced by the LED pixel may be sensed by only its corresponding measurement circuit located adjacent to where light can be reflected from the LED pixel in the presence of a touch to the OLED display. In another example, the association between the LED pixel and the measurement circuitry may be an electrical coupling. Furthermore, the association between the LED pixel and the measurement circuit may be both a proximity association and an electrical coupling. In another example, a measurement circuit may be assigned to one LED pixel, so that the number of measurement circuits associated with the OLED display equals the number of LED pixels in the array.

In further implementations, measurement circuitry may be disposed along the edges of the OLED display and may sense light reflected from an object touching the OLED display.

According to certain implementations, measurement circuitry may be operable when one or more portions of the LED display are not visibly illuminated. For example, when the portion of the display is not active or not visibly illuminated, pulsed light from the LED pixels may be sensed by the measurement circuitry when reflected from an object touching the OLED display, but when the display is visibly illuminated, the measurement circuitry may be inactive. In this implementation, reflected pulsed light may be distinguished from ambient light by a filter. Additionally or alternatively, measurement circuitry may be operable when the display is visibly illuminated.

Measurement circuitry associated with OLED displays may provide signals associated with the sensed reflected light to a processor, which may use the signals to determine the location of the touch on the display. For example, the processor may use the data from the measurement circuits to determine the circuit(s) sensing a highest degree of reflection, and may identify one or more areas of the OLED display as the location(s) of the touch (e.g., center of the touch). Alternatively, the processor may use the data to determine a general area or areas of the display touched by identifying groupings of proximately arranged measurement circuits sensing a reflection. Additionally, the timing of a reflected pulse may be compared to the timing of an illumination signal provided to the LED display in order to identify the location of the reflection.

Certain possible examples are described below with reference to the figures. Components not essential to the implementations are omitted for the sake of clarity. While certain examples are described below in relation to OLED displays, implementations of the may be applicable to a variety of LED display types including, but not limited to, chip-based (inorganic) LED displays, including surface mount device (SMD) LED displays, which may be further combined with a variety of types of tactile touch screens.

FIG. 1 depicts an OLED display and reflective touch screen device 100 according to certain examples. The device 100 of FIG. 1 serves as an OLED display and as a light source for a reflective touch screen and includes: a first OLED display layer 101, a second OLED display layer 102, first layer columns 110, second layer rows 120, nodes 121a, 121b, measurement circuitry 130 with measurement circuits 131, 132, a processor 140 and drive circuitry 150 with row drivers 151, column drivers 152 and timing circuitry 153. According to certain implementations, measurement circuitry 130 may be associated with touch screen device 100 by proximity and/or by electrical coupling. Thus, in FIG. 1, the connection between measurement circuitry 130 and the display layers 101, 102 (e.g., display circuitry) is optional.

In FIG. 1, the first OLED display layer 101 includes a series of columns 110 disposed over the second OLED display layer having a series of rows 120. Columns 110 and rows 120 may be formed of one or more conductive layers separated by a series of organic layers (not shown), such as two or more layers of organic molecules or polymers having OLED conductive and/or emissive properties. Columns 110 and rows 120 are oppositely charged, and each column 110 row 120 intersection point corresponds to a node (e.g., 121a), which is an area of the touch screen/display device 100 that may be illuminated. That is, when an electrical current flows (via drive circuitry 150) from the negatively charged display layer to the positively charged display layer, the current passes through the series of organic layers, which causes electrons in the organic layer to give up energy in the form of photons of light or in the form of heat. Node 121a may be considered a type or part of a transistor and/or may be considered an OLED pixel.

According to certain examples, the OLED display device may be driven at short pulse rates by applying a signal having a short duty cycle (e.g., a square, sine, triangular wave with an above-threshold portion that is short and a below-threshold portion that is long). The short pulse rate may not be visible to a user, but the pulsed light may be reflected off of an object touching the display and may be sensed by measurement circuitry 130. Alternatively, the OLED display device may be visibly illuminated and light may be reflected off of an object and be sensed by measurement circuitry 130.

When the OLED display device 100 is touched, light from each of the nodes(s) e.g., nodes 121a, 121b, proximate to the touch may be reflected off of the object touching the display, and measurement circuitry 130 senses the reflected light for each of the associated nodes 121a, 121b. In some examples, the nodes may correspond to a LED pixel. In certain examples, each node 121a, 121b may be associated with a particular measurement circuit. Thus, in FIG. 1, measurement circuit 131 may be associated with node 121a and measurement circuit 132 may be associated with node 121b.

A processor 140 receives a number of signals from the measurement circuits 130 associated with each of the illuminated nodes responsible for providing the light reflected off of the object, and the processor 140 may compare the signals to each other or to timing reference signals to determine the location of the touch.

Figure 2:
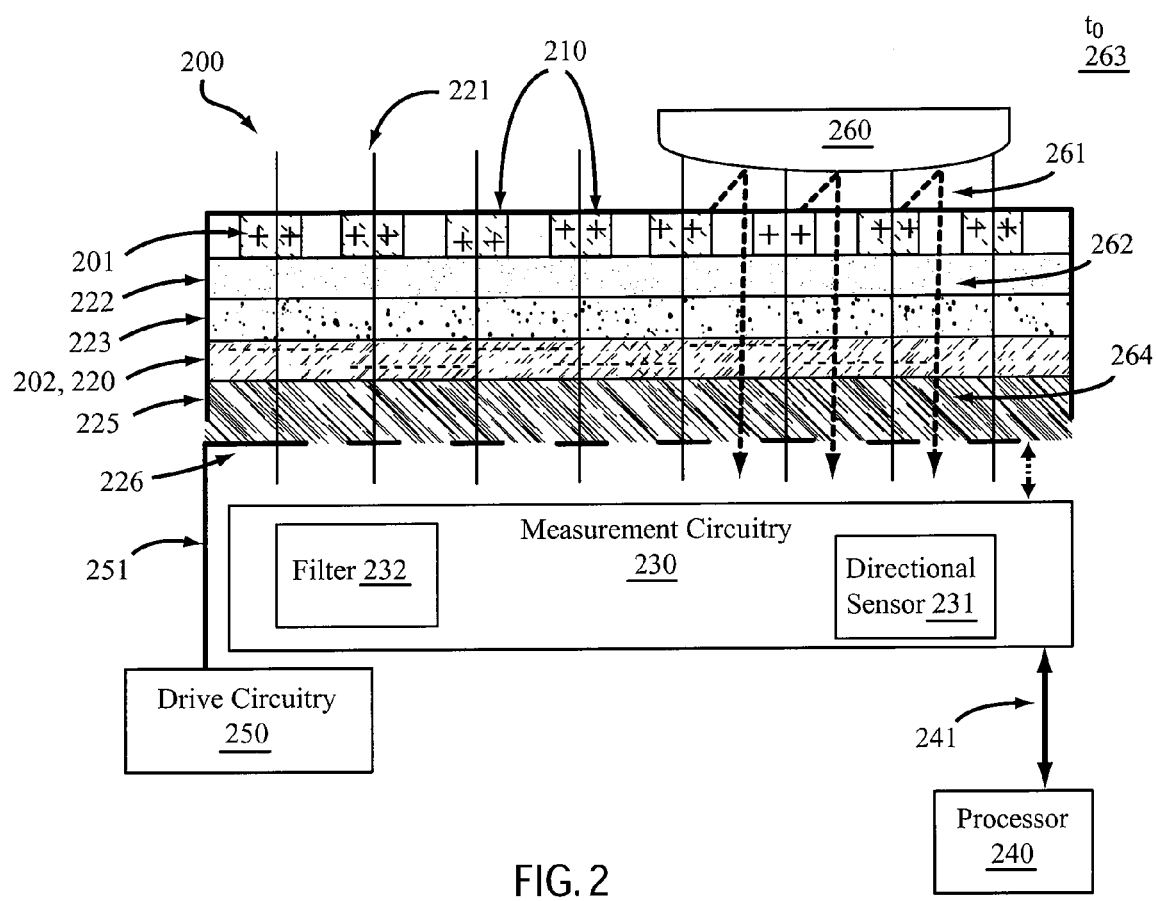
FIG. 2 depicts a cross-sectional view of an OLED display device according to certain examples.

FIG. 2 depicts a cross-sectional view across a row of an OLED display device 200 according to certain examples which may carry out methods for sensing the proximity of an object to a display. The device 200 of FIG. 2 includes a first OLED display layer 201, a second OLED display layer 202, first layer columns 210, second layer row 220, nodes 221, intermediate emissive and/or conductive organic polymer layers 222, 223, substrate 225, windows 226, measurement circuitry 230, processor 240, connection 241, drive circuitry 250, drive circuitry 251 to the display layers, object 260 and reflected light 261.

According to certain implementations, the layers of the OLED display device 200 are deposited on substrate 225 in a series of layers. For example, the second OLED display layer 202 may be deposited on substrate 225 via printing and/or vacuum deposition, for example. The second OLED display layer 202 may be a transparent metallic conductive coating such as indium tin oxide in rows 220. Subsequent intermediate organic layers 222, 223 may be deposited on second OLED display layer 202 via printing, vacuum deposition, and/or organic vapor phase deposition. The first OLED display layer 201 may be a transparent metallic conductive coating an may also be deposited on the intermediate layers 222, 223 using processes similar to those used in depositing the second OLED touch screen/display layer 202. Nodes 221 may correspond to column/row intersection points, and each node may form a display circuit. In certain examples, nodes 221 may be responsible for emitting light from a plurality of nodes on an OLED display when drive circuitry provides a signal across the plurality of nodes at or above an illumination threshold. In some examples, nodes 221 may be responsible for emitting at least pulsed light from the plurality of nodes.

Light emitted from nodes 221 may reach object 260, which may be responsible for reflecting light from the object proximate to the display. In certain implementations, the measurement circuitry 230 may be responsible for detecting the reflected light using the measurement circuitry and may be arranged behind the display circuitry such that the display may be visible to a user and the measurement circuitry 230 may be hidden behind the display. In addition, all or a portion of the measurement circuitry may be provided on a top portion of substrate 225 and the second OLED display layer 202 may be deposited on the measurement circuitry or portions thereof. Substrate 225 may further be transparent or may include windows 226 so that when an object 260 touches or passes over the display surface, reflected light 261 from the object 260 may pass through the series of layers and one or more windows 226 and measurement circuitry 230 may sense the reflected light. It will be understood that measurement circuitry 230 may be associated with OLED device 200 by proximity and/or by electrical coupling.

Measurement circuitry 230 may be configured to sense reflected light 261 at a known intensity 262 or strength, and/or may sense light reflections during time periods ($t_0$) 263 having a known duration. In another example, measurement circuitry 230 may be configured to sense pulsed light 264, and thus at $t_0$ 263, the reflected light 261 may be pulsed light 264 at a known intensity 262. In certain examples, a measurement circuit may be configured with a directional sensor 231 so that light reflected from a limited number of angles or from a limited area proximate the sensor may be sensed. In one example, the directional sensor 231 faces the back side of the OLED display (e.g., faces upward when the sensor is underneath the display) and senses reflected light from a portion of the display directly above the sensor. Measurement circuitry 230 may be further configured with a filter 232 for filtering out light sensed at differing strengths, filtering out non-pulsed light or light having a duration that differs from the predefined period of time.

Signals generated in measurement circuitry in response to detecting light may be provided to processor 240 coupled to measurement circuitry 230 via connection 241, and processor may be responsible for determining the location of the display proximate to the object providing the reflected light.

Figure 3:
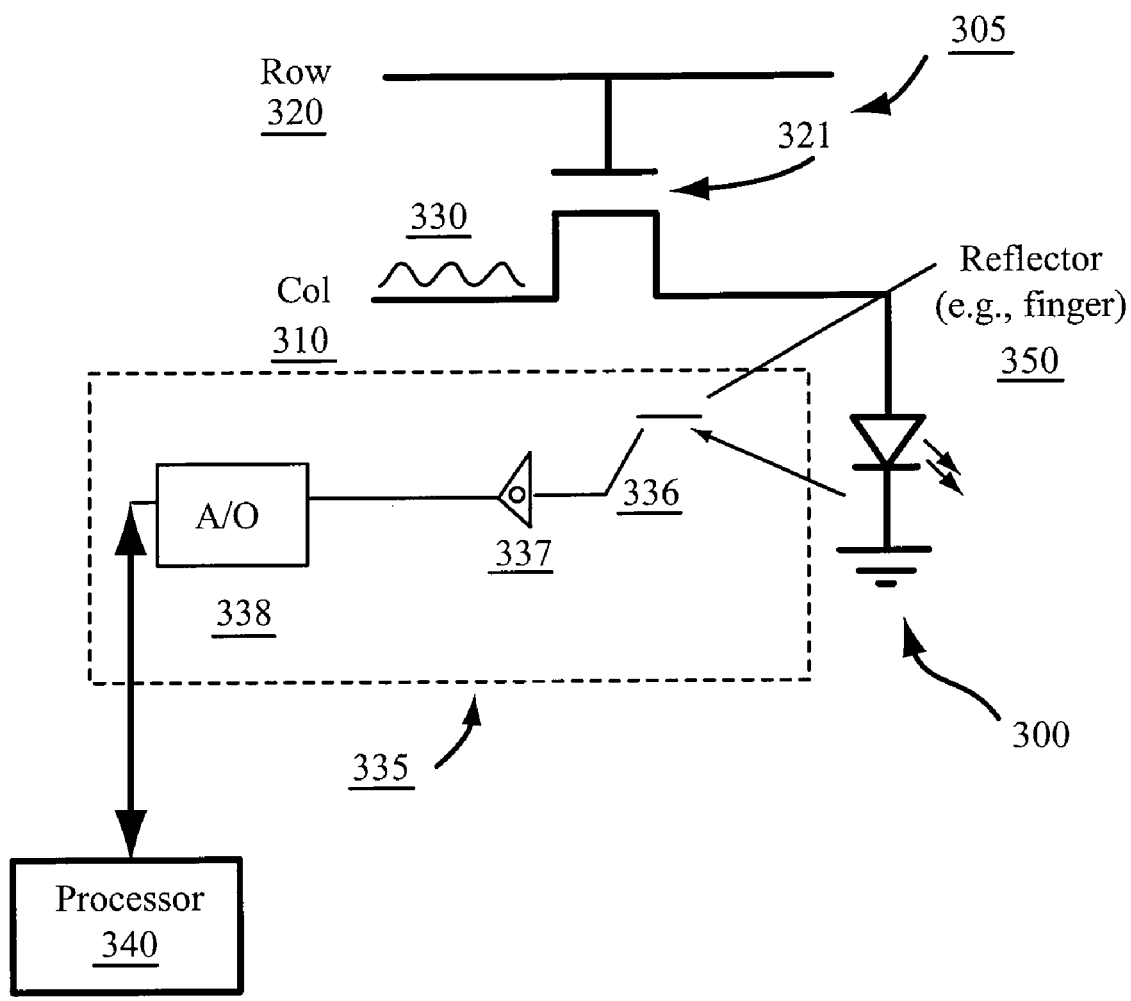
FIG. 3 depicts a schematic of various components associated with an OLED display device according to certain examples.

According to certain implementations, nodes are associated in close proximity with a number of electrical components. FIG. 3 depicts a schematic of an OLED display circuit 300 and associated measurement circuitry 335. In FIG. 3, OLED touch sensor circuit 300 includes a touch screen display pixel 305 having first layer column 310, second layer row 320, node 321 (i.e., drive transistor), and drive circuitry 330 configured to deliver a signal (e.g., a sine, square, or triangular wave) to the OLED touch screen pixel 305 above an illumination threshold. Measurement circuitry 335 may include a light sensor 336, an amplifier 337, an analog-to-digital converter 338, and a connection to or a communicative coupling with a processor 340. A reflector 350 may provide light to the measurement circuitry 335, when present. A reflector 350 may be a finger, a stylus or a glass/plastic covering between the touch screen and the finger or stylus.

For OLED touch sensor circuit 300, a signal may be applied via the drive circuitry 330 across the touch screen pixel 305 at or above an illumination threshold level and the light produced by nodes 321 (i.e., drive transistors) may be visible or may be pulsed intermittently so that the display appears to be non-active or not visible to the user. A reflector 350 may be applied to the touch screen 305 via a touch, and the light reflects off of the object (i.e., the reflector). The reflection may be sensed by a light sensor 336 in the measurement circuit 335. The measurement circuit 335 amplifier 337 may be configured to amplify measurement signals from the light sensor, and the analog-to-digital converter 338 may be responsible for converting the plurality of amplified measurement signals to a plurality of digital signals. The digital signals may be sent to processor 340 for determining the location of the touch.

An OLED display device includes a number of OLED display circuits 300, and each display circuit 300 provides a source of light that may be reflected. For example, each pixel in an OLED display may be a display circuit. In this example, each display circuit 300 may be associated with a measurement circuit. Thus, reflected light may be sensed from a number of display locations because each pixel may be associated with a measurement circuit. Accordingly, the processor 340 may be configured to receive signals from a number of measurement circuits 335, e.g., 2, 4, 6, 8, 10, 20, 30, 100, 200, 300, 500 or more circuits 335 arranged for sensing light from its respective node 321 affected by one or more touches. Although OLED display devices may include a measurement circuit corresponding to each node 321, the OLED display devices may alternatively include a measurement circuit 335 for ½, ¼, ⅑, ¹⁄₁₆, ¹⁄₂₅, ¹⁄₃₆ or $1/n^2$ of the OLED circuits, with the remainder being OLED circuits not associated with measurement circuitry. Alternatively, a measurement circuit 335 may be associated with a number of nodes or pixels.

Figure 4:
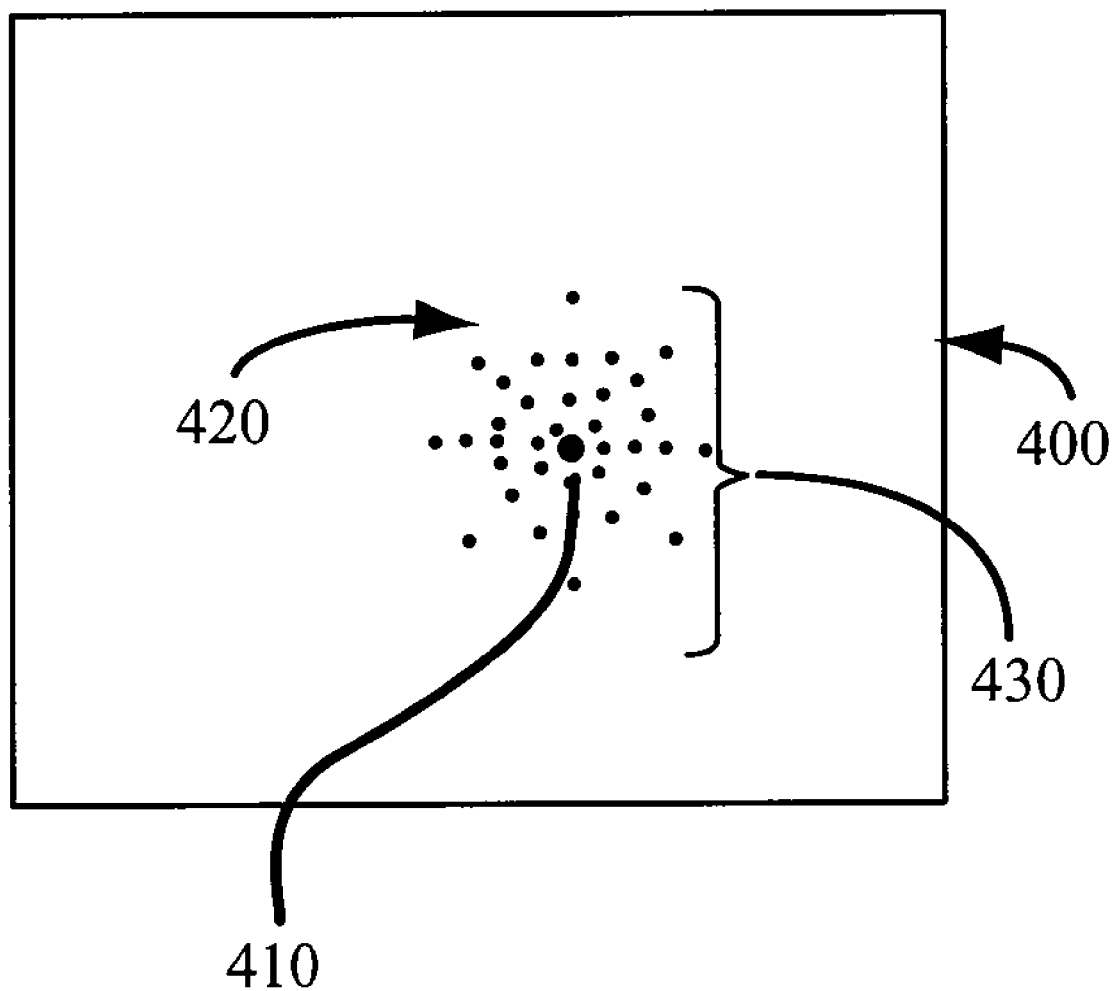
FIG. 4 depicts the location of a touch on an OLED display device according to certain examples.

FIG. 4 depicts a touch on an OLED display 400 including a central point 410 of the touch according to certain examples. In FIG. 4, each point 420 shown on the tactile screen may be associated with a different node providing light reflected from the touch. The grouping of points 430 affected by the touch radiate from the central point 410. Although one touch is depicted on OLED display 400, it will be understood that OLED displays and associated measurement circuitry provided according to certain example may be configured to reflect light and sense multiple simultaneous or near simultaneous touches. This is because the measurement circuitry detects a reflection on a per node or per pixel basis. Thus, for example, a textured or patterned object with multiple contacts may be used to touch the display at multiple contact points simultaneously, and the device may determine the locations of each of the contact points. In another implementation, a textured or shaped object having contacts separated by recesses or gaps may be used to contact the screen and the device may identify the location(s) of the gap between the portions of the display contacted.

In some alternative examples, rather than providing measurement circuitry on a per node basis for an OLED display, measurement circuitry may be provided on the outer edges of the OLED display and may be arranged to sense light reflected from an object touching the OLED display. The sensor may produce signals associated with the sensed light and provide the signals to a processor to identify the location of a touch. Thus, according to certain examples, silvered mirrors are arranged under the OLED display and are disposed at a 45 degree angle. The mirrors may face the top and bottom edges of the OLED display and/or may face the left and right edges of the OLED display. For example, the silvered mirrors may be configured like a four sided pyramid that faces each of the top, bottom, left and right edges of the OLED display. Furthermore, the silvered mirrors may be semi-transparent (or lossy). When the light is reflected from an object touching or passing over the OLED display surface, windows arranged along the bottom of the OLED display enable the reflected light to reach the silvered mirrors. Light may be reflected from the mirror faces at a 90 degree angle to the outside edges of the OLED display, where the light sensors facing inward or toward the display sense reflected light in the left-to-right or x-direction and/or in the top-to-bottom or y-direction.

Figure 5A:
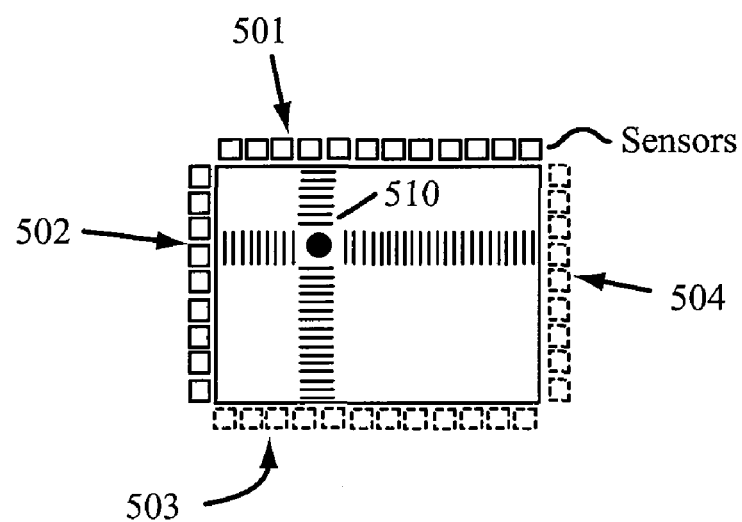
FIG. 5A-B depict an OLED display having groups of sensors arranged at the outer edges of the display, which may be used to determine the location of a touch according to certain examples.

FIG. 5A depicts an OLED display 500 having groups of sensors 501, 502, 503 (optional), 504 (optional) aligned along the outer edges of the display, which may be used to determine the location of a touch 510. According to this example, one or more sensors in at least each of the sensor groups 501-502 may sense light emitted from one or more intersection points that may be reflected off of an object touching the display (reflector). In further implementations, sensors from three or more of sensor groups 501-504 may be arranged to sense reflected light. Sensors 501-504 may be configured as directional sensors such as directional sensor 231 described in relation to FIG. 2 and be arranged on the outer edges of the OLED display 500. Each of the sensors affected by the touch may be arranged to transmit signals to a processor (not shown) for identifying the location of a touch. The processor, for example, may be configured to process the signals and determine the left/right location (x-position) and up/down location (y-position) of the touch on the display. In some examples, an optical filter may be used to filter out uninteresting light from the sensors that would otherwise become noise.

According to certain examples, sensors 501-504 may be arranged to sense light reflected from silvered mirrors. Silvered mirrors may be semi-transparent metallic coated surfaces that partially reflect light and that allow a partial amount of the light to pass through the surface.

Figure 5B:
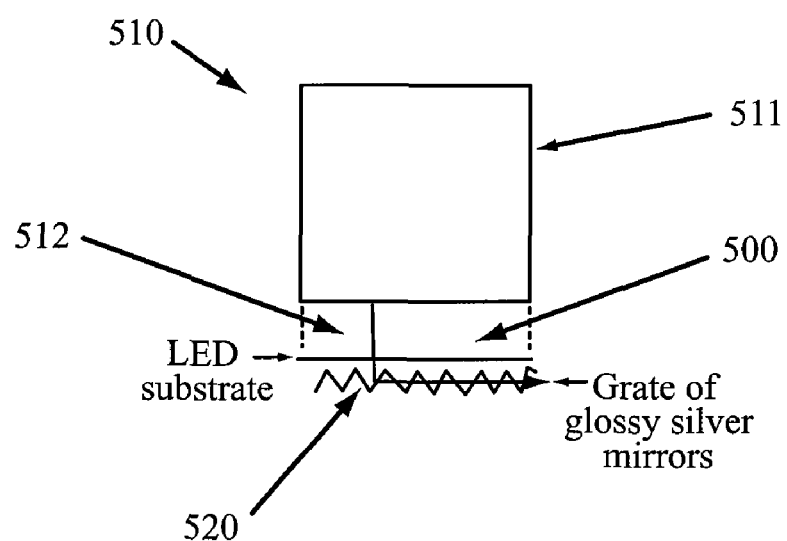

FIG. 5B depicts touch screen 500 (e.g., LED substrate) having a grate of silvered mirrors 520 arranged below OLED display 500. FIG. 5B depicts an area of the display being touched 510 as object 511 is positioned directly above OLED display 500. Thus, light 512 emitted from OLED display 500 may shine up to and reflect off of object 500 back to silvered mirrors 520 where the light 512 may reflect off of the mirrors at or about a 90 degree angle.

In certain examples, light 512 may be emitted from each of the OLED display nodes simultaneously. In this case, it may not always possible to detect multiple touched locations at a given time. In further examples, the nodes of OLED display 500 (e.g., column/row intersection points or pixels) may be illuminated (e.g., pulsed) on a per column and/or per row basis. In this case, the light may be provided as a line-by-line or column-by-column scan. An OLED display providing a light scan may be useful in the example of FIGS. 5A-B because multiple simultaneous touches may be detected using the light scan.

FIGS. 6A-B depict OLED display 600 having two touch locations 601 and 602. As a scan progresses, light may be reflected off of touch location 601 at a first time (T1) and the touch at location 601 may be sensed by the measurement circuitry (not shown) arranged along the edges of display 600. At a second time (T2), when the scan has progressed further through OLED display 600, light may be reflected off of the second touch location 602 and sensed by the measurement circuitry. Touches 601 and 602 may be simultaneous or nearly simultaneous (from the perspective of the user) because a scan of the entire display 600 may be repeated multiple times per second, e.g., 60 times per second, and thus the time span between T1 and T2 may be relatively short.

A processor may be configured to receive signals corresponding to the sensed light at the different times (e.g., T1 and T2) and may be used to determine the areas of the display touched.

According to further implementations, in some cases aliases may be sensed (e.g., when more than one finger inadvertently hits the touch screen). An alias may result from the simultaneous sensing of multiple touches. For example, when each of the LED pixels are illuminated simultaneously, by emitting light from a plurality of nodes on the OLED display when drive circuitry provides a signal across the plurality of nodes at or above an illumination threshold, and when multiple objects are arranged over the display, the top-to-bottom positions (e.g., y-axis positions) and left-to-right positions (e.g., x-axis position) of each of the objects may overlap. At the areas of intersection, an alias may be sensed by detecting reflected light using measurement circuitry arranged along the edges of the OLED display, which may provide sensed signals corresponding to two or more objects so that for each object, a signal associated with an x-axis position and a signal associated with a y-axis position may be provided.

FIG. 6C depicts OLED display 600 having touches 601 and 602 along with aliases 603 and 604. Alias 603 results from the left-to-right position of touch 601 intersecting with the top-to-bottom position of touch 602. Alias 604 results from the top-to-bottom position of touch 601 intersecting with the left-to-right position of touch 602. In order to determine which of the sensed points are aliases and which of the sensed points are touches, the sensed signals may be evaluated. For example, in order to evaluate the sensed signals, light signals may be flashed or re-emitted at the each of the x-axis and y-axis intersection points, and the presence of reflected light may be measured to determine which of the possible aliases are the actual aliases and which of the possible aliases are touches. In another example, evaluating the sensed signals may involve scanning the plurality of nodes by re-emitting light on a per column and/or per row basis, and detecting the presence of reflected light at multiple points in time to identify the locations of the touch, in manner similar to that described in FIGS. 6A-6B.

FIGS. 6D-G depict an image "x", such as an illuminated pixel, provided at each of the possible touch/alias locations at different times T1-T4. When the image reflects off of touch 601 at T1 or off of touch 602 at T4, light may be reflected to the measurement circuitry and the touch may be sensed. When no reflection results from the image being provided to the display, the measurement circuitry and/or the processor may determine that the location sensed is an alias. In further examples, aliasing may be detected by scanning across the array of LEDs to determine the aliases from the actual contact points.

Figure 7A:
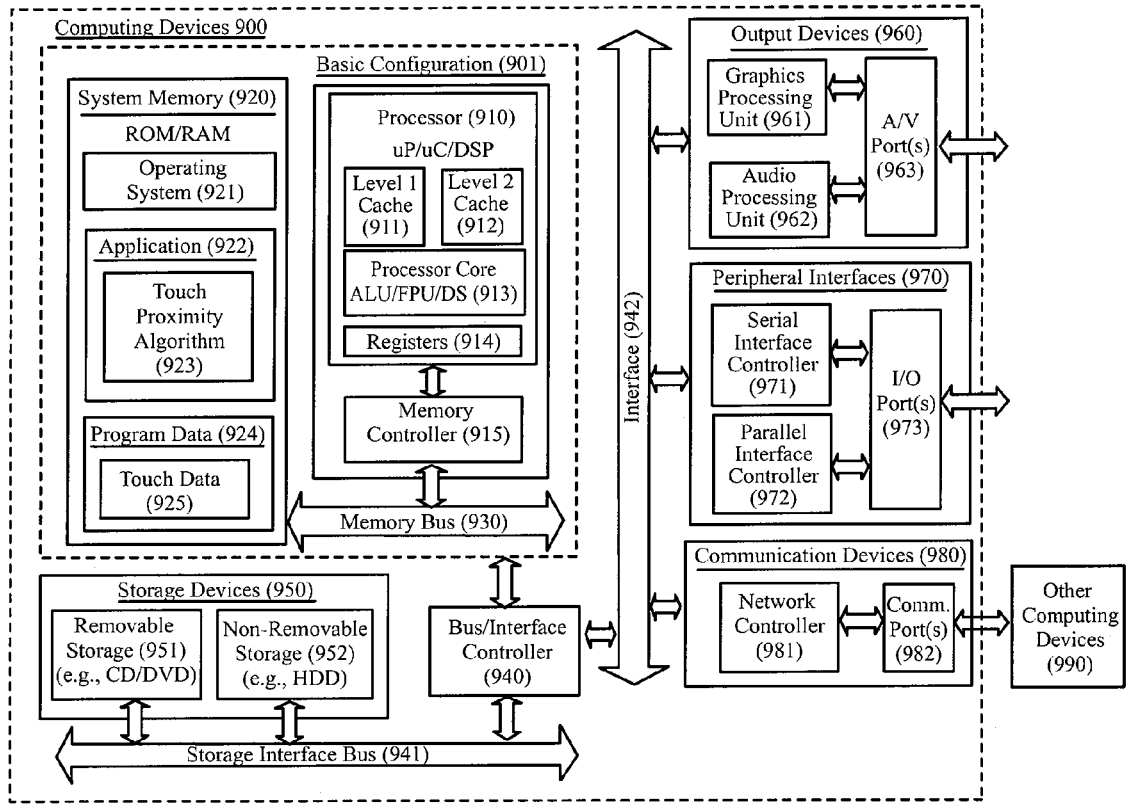
FIG. 7A is a block diagram of a computing device in which the OLED display and measurement circuitry may be integrated in order to execute methods for identifying the location of a touch.

As may be appreciated by one skilled in the art, the OLED display 300 and measurement circuitry 335 described in relation to FIG. 3, for example, may be integrated within a computing environment. FIG. 7A thus generally illustrates a suitable computing environment in which such circuitry may be integrated in order execute methods for sensing the proximity of an object to a display. In a very basic configuration 901, computing device 900 typically includes one or more processors 910 and system memory 920. A memory bus 930 can be used for communicating between the processor 910 and the system memory 920.

Depending on the desired configuration, processor 910 can be of any type including but not limited to a microprocessor (µP), a microcontroller (µC), a digital signal processor (DSP), or any combination thereof. Processor 910 can include one more levels of caching, such as a level one cache 911 and a level two cache 912, a processor core 913, and registers 914. The processor core 913 can include an arithmetic logic unit (ALU), a floating point unit (FPU), a digital signal processing core (DSP Core), or any combination thereof. A memory controller 915 can also be used with the processor 910, or in some implementations the memory controller 915 can be an internal part of the processor 910.

Depending on the desired configuration, the system memory 920 can be of any type including but not limited to volatile memory (such as RAM), non-volatile memory (such as ROM, flash memory, etc.) or any combination thereof. System memory 920 may include an operating system 921, one or more applications 922, and program data 924. Application 922 may include an algorithm 923 that is arranged to sense the proximity of an object to a display. Program Data 924 may include touch data 925 that may be useful for accurately sensing the object proximate to the display. In some examples, application 922 can be arranged to operate with program data 924 on an operating system 921 such that the location of the display proximate the object sensed may be determined. This described basic configuration is illustrated in FIG. 7A by those components within dashed line 901.

Computing device 900 can have additional features or functionality, and additional interfaces to facilitate communications between the basic configuration 901 and any required devices and interfaces. For example, a bus/interface controller 940 can be used to facilitate communications between the basic configuration 901 and one or more data storage devices 950 via a storage interface bus 941. The data storage devices 950 can be removable storage devices 951, non-removable storage devices 952, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 920, removable storage 951 and non-removable storage 952 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media can be part of device 900.

Computing device 900 can also include an interface bus 942 for facilitating communication from various interface devices (e.g., output interfaces, peripheral interfaces, and communication interfaces) to the basic configuration 901 via the bus/interface controller 940. Example output devices 960 include a graphics processing unit 961 and an audio processing unit 962, which can be configured to communicate to various external devices such as a display or speakers via one or more A/V ports 963. Example peripheral interfaces 970 include a serial interface controller 971 or a parallel interface controller 972, which can be configured to communicate with external devices such as input devices (e.g., keyboard, mouse, pen, voice input device, touch input device, etc.) or other peripheral devices (e.g., printer, scanner, etc.) via one or more I/O ports 973. An example communication device 980 includes a network controller 981, which can be arranged to facilitate communications with one or more other computing devices 990 over a network communication via one or more communication ports 982. The communication connection may be one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 900 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 900 can also be implemented as a personal computer including both laptop computer and non-laptop computer configurations. Computing device 900 may also be implemented as an interactive system, such as an information kiosk, television, or a gaming device.

Figure 7B:
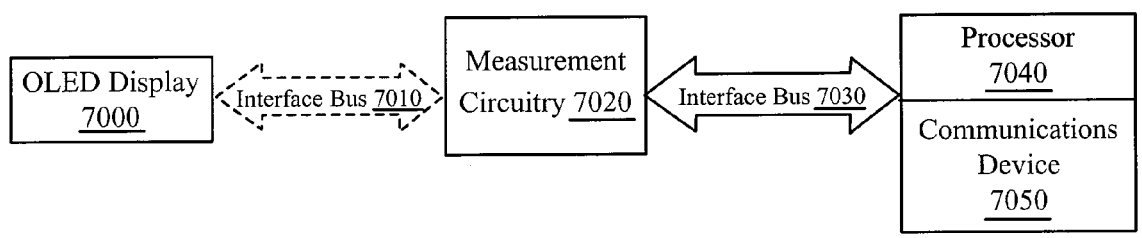
FIG. 7B is a block diagram of OLED display optionally communicatively coupled to measurement circuitry via interface bus.

FIG. 7B is a block diagram of OLED display 7000 optionally communicatively coupled to measurement circuitry 7020 via interface bus 7010. In some alternative embodiments, OLED display 7000 may not be coupled to measurement circuitry 7020 via data bus 7010, but rather OLED display 7000 may emit light sensed by measurement circuitry 7020. Data sensed or collected by measurement circuitry 7020 from OLED display 7000 may be sent a processor 7040 and/or a communications device 7050 in a computing device via interface bus 7030.

The OLED display devices disclosed herein may be implemented in passive-matrix, active-matrix, transparent, top-emitting, foldable and/or white OLED devices. Furthermore, a variety of implementations are contemplated in addition to those described above. For example, other LED types such as chip-based LEDs and discreet LEDs may be implemented in a LED display device having a reflective touch screen.

The present disclosure is applicable to a variety of LED display and measurement circuitry applications, including displays and touch screens for mobile phones, personal computers, PDAs, public access terminals, gaming machines, point of sale terminals, kiosks, ATMs, industrial terminals, and LED screens for televisions, motor vehicles, outdoor applications, and indoor applications. LED displays may be small, e.g., 1 cm.×1 cm., 1"×1", 2"×3", 4"×3", 9"×11" or large, e.g., 2'×2', 8'×6', 10'×12', depending on the type of application.

The foregoing describes various examples of LED displays and light sensor circuitry. Following are specific examples of methods and systems of LED displays and light sensor circuitry. These are for illustration only and are not intended to be limiting.

According to certain implementations, a display device includes an OLED display having a plurality of nodes configured to emit light when drive circuitry provides a signal (e.g., voltage signal) across the plurality of nodes at or above an illumination threshold; and measurement circuitry disposed proximate to the plurality of nodes, where the measurement circuitry may be configured to sense the light reflected off of an object positioned over the OLED display.

In variations of the above implementation, each of the plurality of nodes may be an OLED pixel, and in some instances, the measurement circuitry includes a plurality of measurement circuits, and each of the measurement circuits may be associated with one OLED pixel for sensing the reflected light emitted from the OLED pixel. In other variations, the measurement circuitry may be configured to sense the light reflected through the OLED display, and the OLED display includes a plurality of OLED display layers. In certain configurations, the measurement circuitry may be configured to sense the reflected light at a predefined intensity, during a predefined time interval, and/or that may be emitted from the plurality of nodes as pulsed light.

Variations may involve the measurement circuitry further includes a directional sensor configured for sensing the reflected from limited angles, and the directional sensor may be arranged on an outer edge of the OLED display. In addition, to the directional sensor, the measurement circuitry may further include a plurality of silvered mirrors arranged under a portion of the OLED display. The measurement circuitry may further include a filter for filtering out noise.

In further variations, a processor may be coupled to the measurement circuitry, which may be configured to: receive signals from the measurement circuitry, the signals corresponding to the sensed light; and determine the location of the touch.

In another implementation a display device includes measurement circuitry including a plurality of measurement circuits; and an OLED display having a plurality of OLED pixels, where each of the plurality of OLED pixels may be associated with one of the plurality of measurement circuits.

In certain variations, each of the plurality of measurement circuits may be configured to sense light reflected from its associated OLED pixel, and each of the plurality of measurement circuits may be further configured to sense reflected light that is one or more of: pulsed light, light that has a predefined strength, or light that has a duration of illumination that is predefined.

FIG. 8A depicts a computer program product 700 that may be implemented in computing device 500 for sensing the proximity of an object to a display. The computer program product 800 includes a signal bearing medium 810 configured to execute one or more instructions 820. The signal bearing medium 810 may be configured as a computer-readable medium 822, a recordable medium 824 and/or a communications medium 826.

Figure 8B:
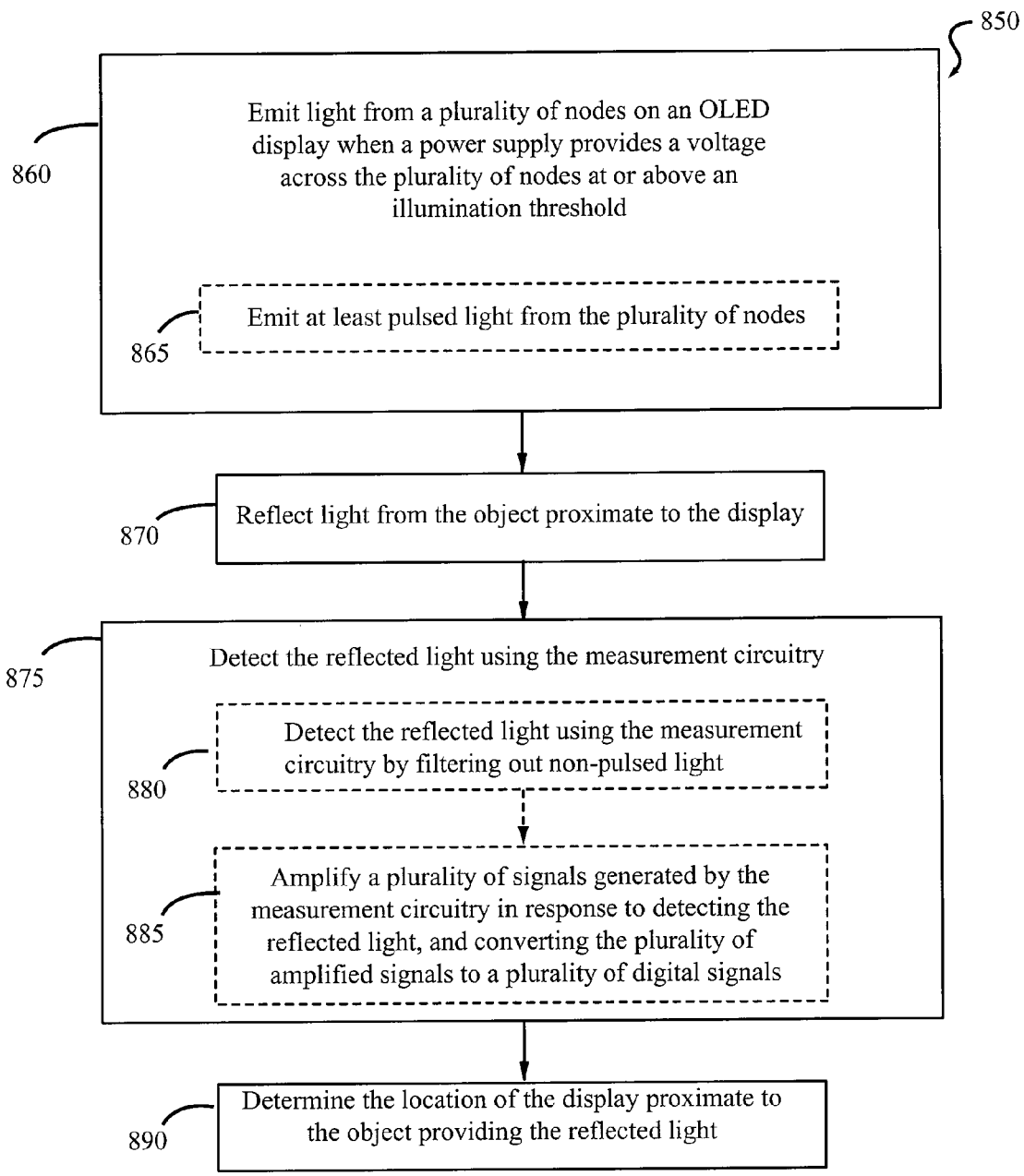
FIG. 8B is a flowchart of a computer-implemented method for sensing a touch on a touch-sensitive display device according to certain examples, all arranged in accordance with the present disclosure.

FIG. 8B depicts a flowchart of a method 850 for sensing the proximity of an object to a display, which may be implemented in computer program product 800 and/or in computing device 700. According to FIG. 8B, the computer implemented method involves, emitting light from a plurality of nodes on an OLED display when drive circuitry provides a signal across the plurality of nodes at or above an illumination threshold (operation 860). In certain implementations, the emitted light may be pulsed light (operation 865). When an object is provided proximate or above the display light may be reflected off of the object and back towards the display (operation 870). The reflected light may be detected using the measurement circuitry (operation 875). In some implementations the reflected light may be detected using the measurement circuitry by filtering out non-pulsed light (operation 880) In addition or alternatively, the measurement circuitry may generate a plurality of signals in response to detecting the reflected light, amplify the signals, and convert the plurality of amplified signals to a plurality of digital signals (operation 885). The location of the display that is proximate to the object providing the reflected light may be determined (operation 890).

The present disclosure is not to be limited in terms of the particular examples described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular examples only, and is not intended to be limiting.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various examples of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one example, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the examples disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative example of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and examples have been disclosed herein, other aspects and examples will be apparent to those skilled in the art. The various aspects and examples disclosed herein are for purposes of illustration and are not intended to be limiting, with the true scope and spirit being indicated by the following claims.

What is claimed is:

1. A display device for sensing the proximity of a touch, comprising:
   an organic light emitting diode (OLED) display comprising OLED materials forming a plurality of nodes configured to emit light when drive circuitry provides a signal across the plurality of nodes at or above an illumination threshold; and
   measurement circuitry disposed proximate to the plurality of nodes, wherein the measurement circuitry is configured to sense the light reflected off of an object positioned over the OLED display and passed through the OLED materials, and wherein the measurement circuitry is further configured to provide a measurement signal responsive to the sensed reflected light.

2. The device of claim 1, wherein each of the plurality of nodes comprises an OLED pixel.

3. The device of claim 2, wherein the measurement circuitry comprises a plurality of measurement circuits, and each of the measurement circuits is associated with one OLED pixel for sensing the reflected light emitted from the OLED pixel.

4. The device of claim 1, wherein the OLED materials comprise a plurality of OLED display layers.

5. The device of claim 1, wherein the measurement circuitry is configured to sense the reflected light at a predefined intensity.

6. The device of claim 1, wherein the measurement circuitry is configured to sense the reflected light during a predefined time interval.

7. The device of claim 1, wherein the OLED display is configured to emit pulsed light, and the measurement circuitry is configured to sense the reflected light that is emitted from the plurality of nodes as pulsed light.

8. The device of claim 1, wherein the measurement circuitry further comprises a directional sensor configured to sense the reflected light from a limited area proximate to the sensor.

9. The device of claim 8, wherein the directional sensor is arranged on an outer edge of the OLED display.

10. The device of claim 9, wherein the measurement circuitry further comprises a plurality of silvered mirrors arranged under a portion of the OLED display.

11. The device of claim 1, wherein the measurement circuitry further comprises a filter for filtering out noise.

12. The device of claim 1, further comprising a processor coupled to the measurement circuitry, wherein the processor is configured to:
   receive measurement signals from the measurement circuitry, the measurement signals being indicative of the sensed reflected light;
   evaluate the received measurement signals; and
   determine the location of the touch from the evaluation of the received measurement signals.

13. A method for sensing a touch on an organic light emitting diode (OLED) display, comprising:
   emitting light from a plurality of nodes on the OLED display when drive circuitry provides a signal across the plurality of nodes at or above an illumination threshold, wherein the nodes are formed from OLED materials;
   detecting reflected light along the edges of the OLED display, wherein the reflected light is passed through the OLED materials, wherein the detecting occurs using measurement circuitry arranged along the edges of the OLED display to provide sensed signals corresponding to two or more objects proximate to the display, wherein the sensed signals for each object comprises a signal associated with an x-axis position and a signal associated with a y-axis position; and
   evaluating the sensed signals associated with the x-axis and y-axis to identify the location of the touch.

14. The method of claim 13, wherein evaluating the sensed signals comprises:
   re-emitting light at each of the x-axis and y-axis intersection points; and
   detecting the presence of reflected light to identify the locations of the touch.

15. The method of claim 13, wherein evaluating the sensed signals comprises:
   scanning the plurality of nodes by re-emitting light on a per column and/or per row basis; and
   detecting the presence of reflected light at multiple points in time to identify the locations of the touch.

16. A method for sensing the proximity of an object to an organic light emitting diode (OLED) display, comprising:
   emitting light from a plurality of nodes on the OLED display when drive circuitry provides a signal across the plurality of nodes at or above an illumination threshold, and wherein the OLED display includes OLED materials;
   detecting reflected light using measurement circuitry to provide a measurement signal, wherein the reflected light corresponds to at least a portion of emitted light that is reflected from the object proximate to the display through the OLED materials;
   evaluating the measurement signal; and
   determining the location of the display proximate to the object providing the reflected light based on at least the evaluation of the detected reflected light.

17. The method of claim 16, further comprising amplifying a plurality of signals generated by the measurement circuitry in response to detecting the reflected light, and converting the plurality of amplified signals to a plurality of digital signals.

18. The method of claim 16, wherein emitting light from the plurality of nodes comprises emitting a pulsed light from the plurality of nodes.

19. The method of claim 18, wherein detecting the reflected light further comprises filtering out non-pulsed light.

* * * * *